No. 700,202. Patented May 20, 1902.
F. W. JAEGER.
MECHANICAL MOVEMENT.
(Application filed July 11, 1901.)
(No Model.) 4 Sheets—Sheet 2.
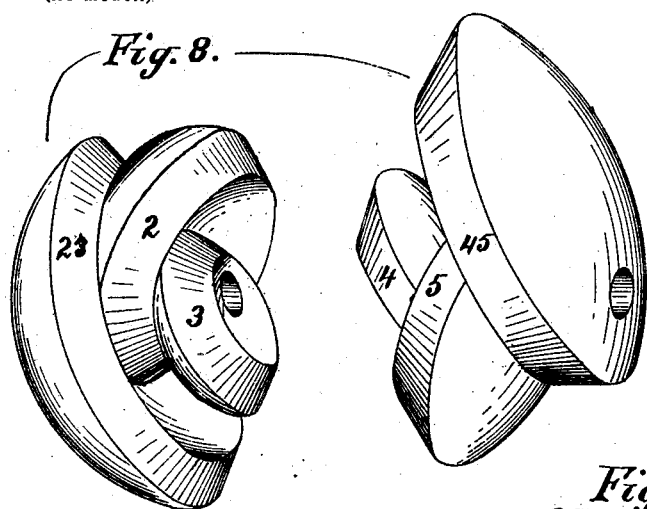
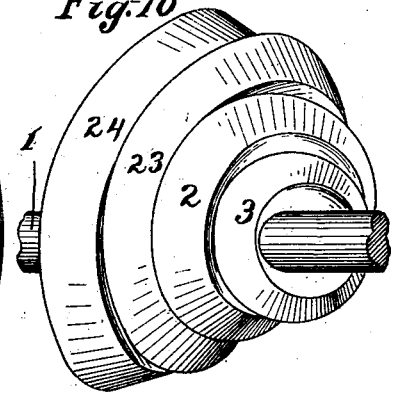
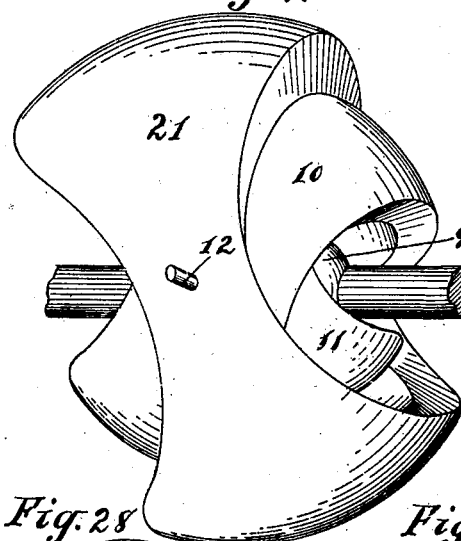
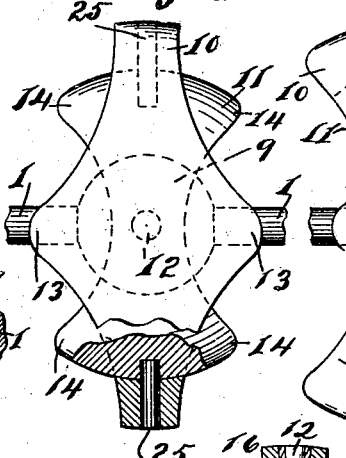
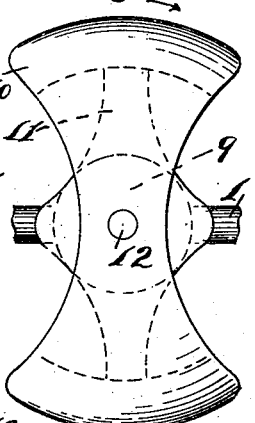
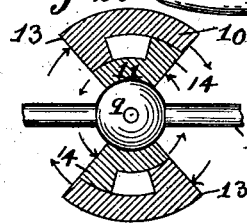
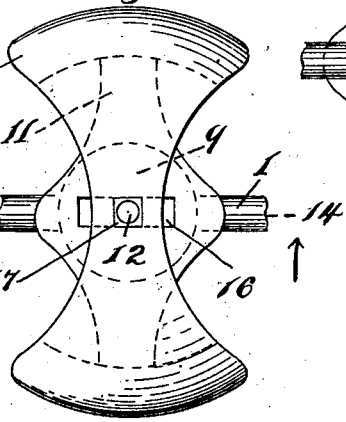
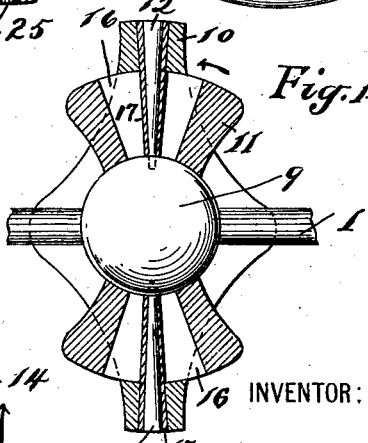
WITNESSES:
INVENTOR:
BY Frederick W. Jaeger
ATTORNEY No. 700,202. Patented May 20, 1902.
F. W. JAEGER.
MECHANICAL MOVEMENT.
(Application filed July 11, 1901.)
(No Model.) 4 Sheets—Sheet 3.

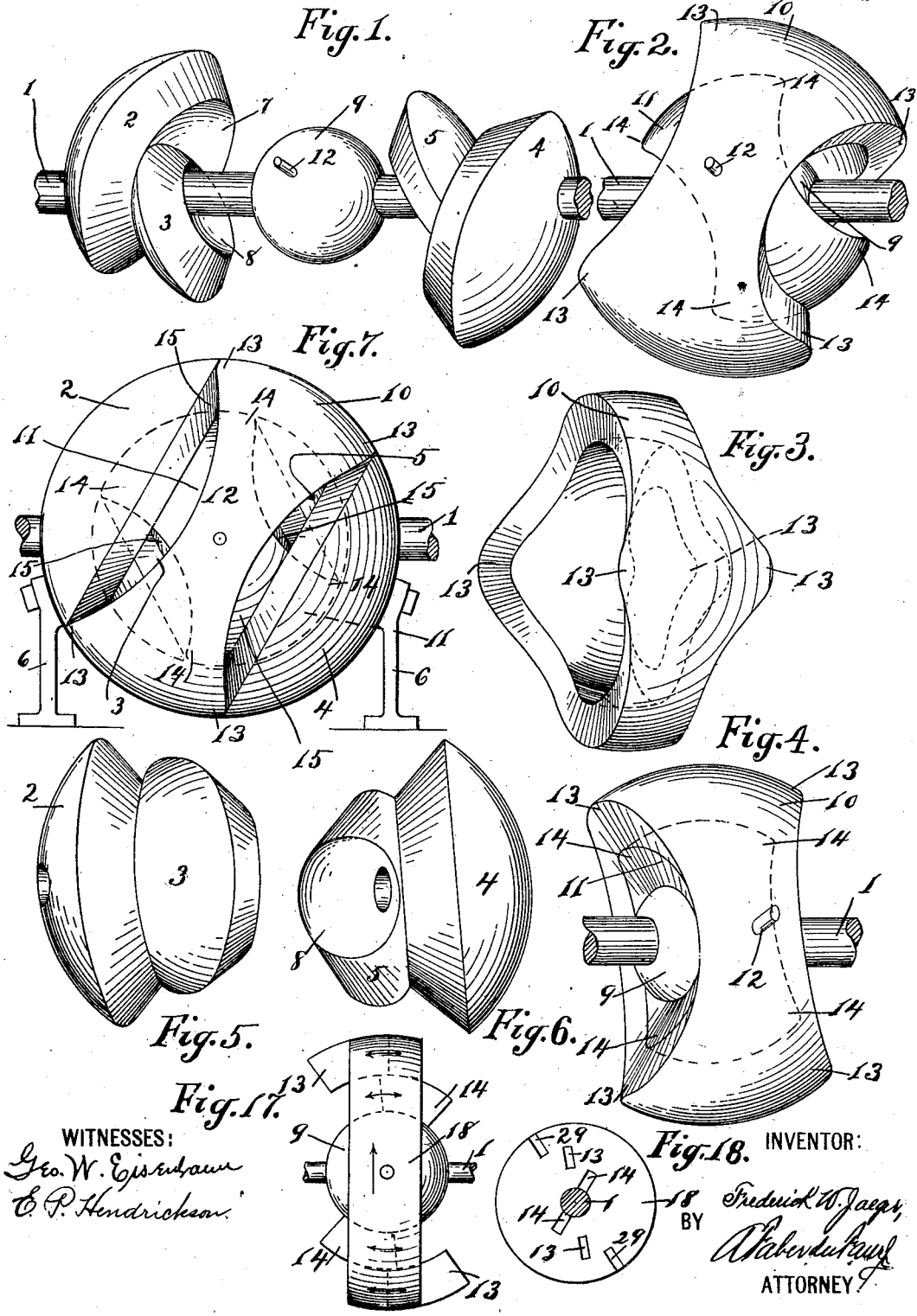

WITNESSES: INVENTOR:
Frederick W. Jaeger
BY
ATTORNEY

No. 700,202. Patented May 20, 1902.
F. W. JAEGER.
MECHANICAL MOVEMENT.
(Application filed July 11, 1901.)
(No Model.) 4 Sheets—Sheet 4.
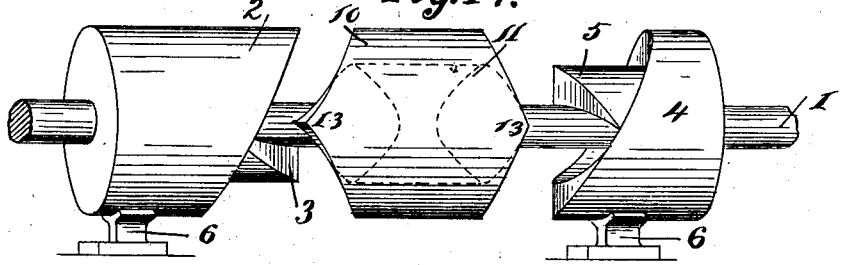
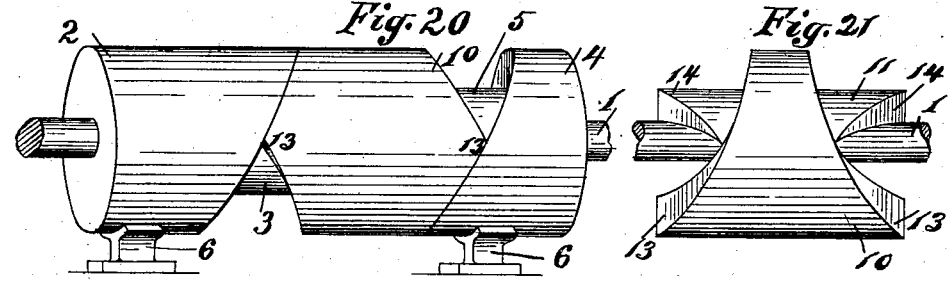 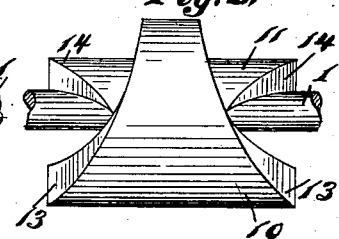
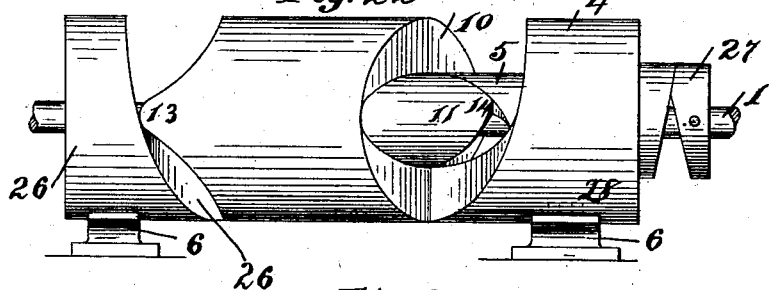 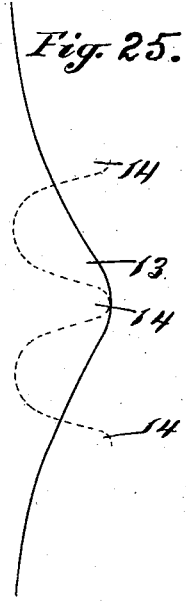
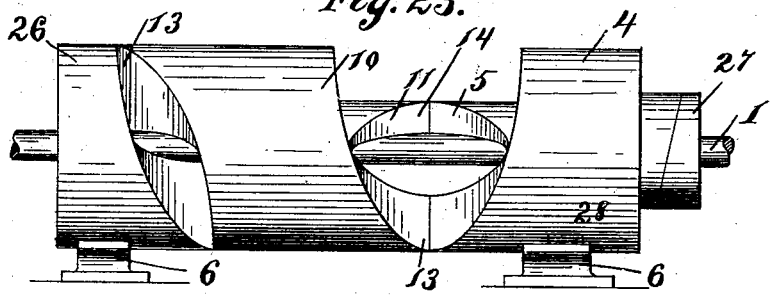
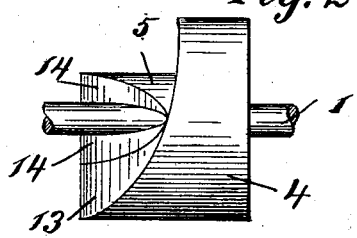
WITNESSES:
Geo W Eisenbraun
E. P. Hendrickson
INVENTOR:
Frederick W. Jaeger,
BY
ATTORNEY
THE NORRIS PETERS CO., PHOTO-LITHO., WASHINGTON, D. C.

UNITED STATES PATENT OFFICE.

FREDERICK W. JAEGER, OF NEW YORK, N. Y.

MECHANICAL MOVEMENT.

SPECIFICATION forming part of Letters Patent No. 700,202, dated May 20, 1902.

Application filed July 11, 1901. Serial No. 67,832. (No model.)

*To all whom it may concern:*

Be it known that I, FREDERICK W. JAEGER, a citizen of the United States of America, residing in the borough of Manhattan, New York, in the county of New York and State of New York, have invented certain new and useful Improvements in Mechanical Movements, of which the following is a specification.

My invention has reference to mechanical movements, and has for its object the formation of a plurality of pockets at different diameters surrounding a shaft and located between abutments.

To this end my invention consists, essentially, in a mechanical movement comprising a rotary shaft having a plurality of projecting noses mounted upon the same and placed at different distances from the shaft, said projecting noses being mounted to turn with the shaft to have a movement at an angle to the plane of their rotation, and end abutments adapted to conform to the noses, and also in a mechanical movement comprising a rotary shaft having a plurality of independent projecting noses mounted upon the same and placed at different distances from the shaft, said projecting noses being mounted to turn with the shaft to have a movement at an angle to the plane of their rotation, and end abutments adapted to conform to the noses.

The nature of my invention will best be understood when described in connection with the accompanying drawings, in which—

Figure 15:
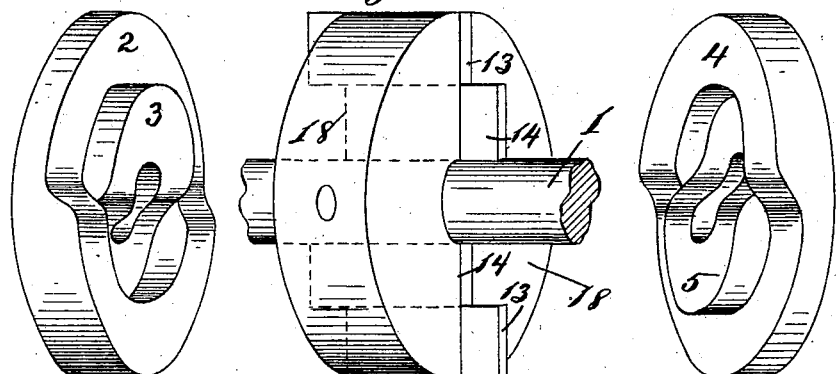
Figure 16:
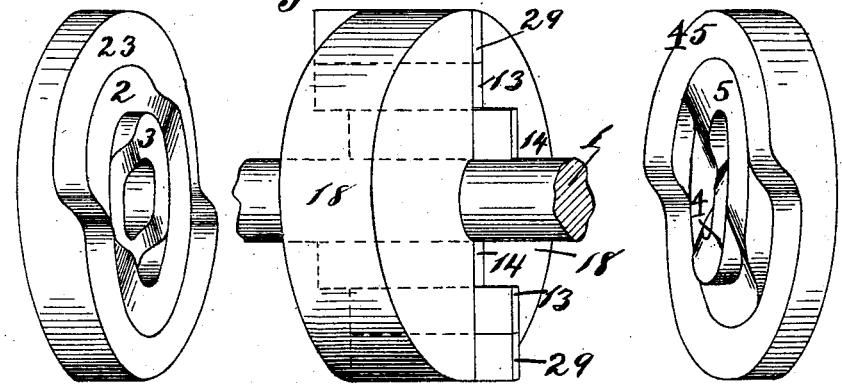
Figure 26:
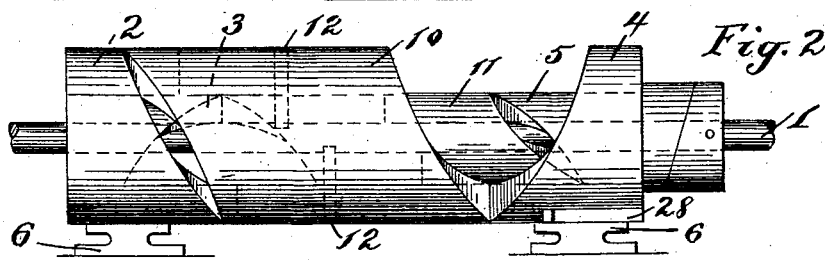
Figure 27:
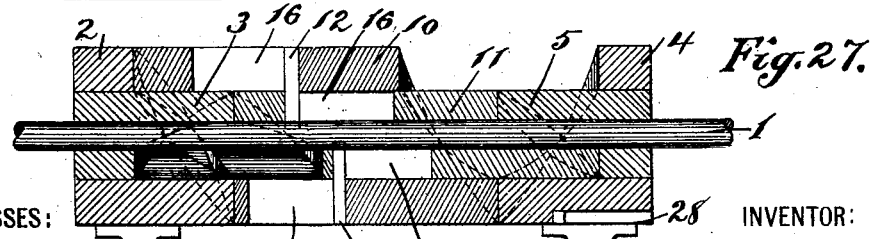

Figure 1 represents a perspective view of part of the movement—that is to say, the shaft and the abutments. Fig. 2 is a perspective showing the noses attached to the shaft. Fig. 3 is a perspective view of the outer noses detached. Fig. 4 is a perspective similar to Fig. 2, but showing the outer and inner noses in different positions. Figs. 5 and 6 are plan views of the abutments looking from the bottom of Fig. 1 with the shaft removed. Fig. 7 is a side elevation of the assembled movement. Fig. 8 is a perspective view similar to Fig. 1, but with the shaft removed and showing a triple set of abutments. Fig. 9 is a perspective illustrating a triple set of noses adapted to operate between the abutments shown in Fig. 8. Fig. 10 is a perspective view illustrating a quadruple system of abutments. Figs. 11, 12, and 13 are side views showing modified methods of connecting the projecting noses to the shaft and to each other. Fig. 14 is a section on the line 14 14, Fig. 13. Fig. 15 is a perspective view illustrating a modified form in which the sets of noses are movable relative to the carrying-disk, the parts in said view being detached. Fig. 16 is a similar view showing a triple set of noses and corresponding abutments. Fig. 17 is a side elevation illustrating a modification in which the sets of noses are movable in curved lines. Fig. 18 is a modification of Fig. 17 in sectional end view. Fig. 19 is a perspective illustrating a modification in which the noses are arranged to reciprocate and turn, the parts being spread apart. Fig. 20 is a similar view showing the parts in their working positions. Fig. 21 is a side elevation showing the noses removed. Fig. 22 is a side elevation showing two sets of noses adapted to engage with the opposite abutment. Fig. 23 is a similar view showing the noses in different relative positions with respect to the abutments. Fig. 24 is a side elevation showing a modified form for the abutments. Fig. 25 illustrates the development of the contact-lines of the abutments shown in Fig. 24. Fig. 26 is a side elevation showing a modification of the noses shown in Figs. 19 and 20. Fig. 27 is a longitudinal section of Fig. 26. Fig. 28 is a vertical central section illustrating a modified form, in which the noses are of different lengths.

Similar numerals of reference designate corresponding parts throughout the several views of the drawings.

In the accompanying drawings I show various forms of using a multiple piece, in which projecting noses have essentially a longitudinal movement during their rotation between the abutments; but in all these various forms shown I adhere to the one principle, although the modifications I have shown so fully are for the purpose of illustrating the center piece in two forms—first, that in which the projecting noses of the center rotating piece have a longitudinal movement parallel with the shaft, and, secondly, that in which the center piece placed between abutments has an oscillatory movement during its rotation. In the present invention I have shown sets of projecting noses arranged outwardly one from the other—that is to say, at different radii. It is obvious that any number of projecting noses could be used, and it would not be a distinct invention to use fixed projecting noses—that is, fixed relative to the shaft—or to use noses movable longitudinally independently of the shaft during its rotation. The gist of this invention consists in using a multiplicity of noses placed outwardly from one another.

In many forms of rotary motors and pumps heretofore invented a movement in a single form has been used, but never in the double form, where there is a movement of a double set or more than one set of noses placed outwardly from the other moving between abutments, and I wish it to be understood that I could still show more forms of this movement in addition to those I show in the drawings by making combinations of those shown. I could have the one set of noses immovable and the other set movable relative to the shaft.

Referring at present to Figs. 1 to 7 of the drawings, numeral 1 designates a shaft mounted to turn in suitable bearings in abutments 2 3 and 4 5, which latter are attached to standards 6 6 or otherwise rigidly secured in position. This shaft can be rotated by means of a belt and pulley or by any other usual means. (Not shown.) The abutments 2 3 and 4 5 are made composite in form—that is to say, each consists of an inner and outer abutment arranged eccentrically with respect to the shaft 1 and to each other and also placed at an angle to each other. Each such component abutment is made in the form of a truncated cone having a dished face 7 8. The two component abutments may be made in one piece or made separately and suitably secured to each other. The shaft 1 is provided between the abutments 2 3 and 4 5 with a spherical enlargement 9, about which the center pieces 10 and 11 are adapted to oscillate. The said center pieces are placed the one within the other and are movably attached to the shaft by means of a fulcrum-pin 12 passing through both the center pieces and the spherical enlargement 9. Of course it is to be understood that two pins entering the enlargement from opposite sides could be used. The center pieces 10 11 are made hollow and in the form of segments of a sphere and are each provided with projecting noses 13 and 14, respectively adapted to engage and run in contact with the coned surfaces of the abutments 2 3 and 4 5. In the present example I have four such noses upon each face of each center piece; but of course any other suitable number of such noses could be employed. The center pieces 10 and 11 are fitted the one into the other, and the inner center piece 11 fits the curvature of the enlargement 9 of the shaft 1. When the shaft 1 is turned, the noses 14 on the center piece 11 engage with and ride over the coned surfaces of the abutments 3 and 5 and the noses 13 on the center piece 10 engage with and ride over the coned surfaces of the abutments 2 and 4, thus inducing oscillation of the center pieces about the pin 12. In view of the component abutments being set at an angle to each other the two center pieces move or oscillate in opposite directions, as shown in Fig. 2, although they are coincident in their central position, as shown in Fig. 4. It will be readily understood that in the combined rotary and oscillatory movements of the center pieces pockets 15 are continually being formed between both center pieces 10 11 and the abutments 2 3 and 4 5, which said pockets are located at different distances from the center of the shaft 1 in view of the fact that the noses 13 and 14 are located at different distances from the center.

In Figs. 8 and 9 I have shown a construction similar to that illustrated in the preceding figures; but the abutments are shown as composed of three component parts each designated by numerals 2 3 23 and 4, 5, and 45, and three nested center pieces 10, 11, and 21 are employed in conjunction with said abutments, thus forming three sets of pockets at different distances from the shaft.

Fig. 10 shows an abutment composed of parts 2, 3, 23, and 24, arranged eccentric to the shaft 1 and to one another, it being understood that the opposite abutment is of the same construction and that the center piece moving between the two would have a corresponding construction.

In Fig. 11 the inner center piece 11 is shown as pivoted to the enlargement 9 by the pin 12, as before, while the outer center piece 10 is pivoted to the inner center piece by means of pins 25 25 passing through the outer and into the inner center piece, these pieces being at right angles to the pin 12. In this construction the noses 13 14 on the two center pieces are spaced at an angle of forty-five degrees to one another instead of being radially in line, as in Figs. 1 to 7.

In Fig. 12 the noses on the center pieces 10 11 are placed similarly to those in Fig. 11, but they are mounted to turn about one pin 12, as in Figs. 1 to 7.

In Figs. 13 and 14 the center pieces are similarly disposed as in Figs. 11 and 12; but two pins 12, attached to the enlargement 9 on the shaft 1, pass through slots 16 in the inner piece 11 and are secured in the outer piece 10. These pins may have thereon slides 17, fitting the slots 16 in the inner piece 11. This construction permits the inner piece to move independently of the outer piece. While in the preceding examples I have shown the center pieces carrying the projecting noses mounted to oscillate and rotate, the oscillatory movement may be omitted and the noses arranged to reciprocate within a single rotary center piece. Such a construction I have illustrated in Fig. 15, where 18 is a center piece mounted rigidly upon the shaft 1 between abutments 2 3 and 4 5 and carrying at different distances from the shaft slidable noses 13 14, mounted transversely therein and adapted to engage with the stationary abutments 2 3 and 4 5. It is evident that during the rotation of the center piece 18 the noses are alternately projected across the center piece by engagement with the abutments 2 3 and 4 5. The abutments in this instance are provided with cam-surfaces oppositely arranged.

Fig. 16 illustrates a construction similar to Fig. 15, but shows three series of noses 13, 14, and 29 arranged radially at different distances from the shaft. In both instances the pocket formation takes place as previously described.

In Fig. 17 I have shown a rotary center piece 18 and noses, as in Fig. 15; but the noses 13 and 14 are arched or curved, so as to oscillate in a curved path between the abutments during the rotation of the center piece.

In Fig. 18 a construction similar to that of Fig. 16 is shown; but the noses 13, 14, and 29 are not arranged in radial lines, but staggered. The noses may be straight or curved.

In Figs. 19, 20, and 21 I have shown a form in which the center pieces 10 and 11 are fast to one another or may be in one piece and are rigidly mounted upon the shaft 1, which latter can slide in its bearings while rotating. The center pieces are provided with projecting noses 13 14, adapted to engage and ride over abutments 2 3 and 4 5. Of course the center pieces 10 11 could be arranged to slide on the shaft and the latter simply be rotated.

In Figs. 22 and 23 the center piece comprises two component pieces 10 and 11 on one side, having nosed surfaces adapted to engage and ride over an abutment 4 5, while on the opposite side said center piece has a single nose 13 only engaging a single abutment 26. In this construction a cam 27 is used to move the abutment 4 5 forward in slots 28 at certain intervals during the rotation of the center piece 10 11, as the cam-lines of the abutments and center pieces shown would not cause contact of the projecting noses at all times during the rotation.

In Fig. 24 I have illustrated a construction adapted for an abutment or center piece. In this instance the abutment has the inner surface 5 double-cammed and the outer surface single-cammed, as it may be desirable at times to use this form.

Fig. 25 shows a development of the cam edges of Fig. 24.

Figs. 26 and 27 show a construction similar to Figs. 22 and 23, excepting that both abutments 2 3 and 4 5 are double and that the center pieces 10 11 are arranged one within the other and are held to the shaft 1 by pins 12, passing through slots 16 in the outer and inner center pieces and entering the shaft, so that the noses of the inner piece 11 will move in a direction opposite to that of the outer piece 10 in their rotation.

While in the preceding examples I have shown the several projecting noses of substantially the same contact length, it is evident that the lengths of the noses may differ. Such a construction I have illustrated in Fig. 28, where the noses 13 14 are shorter on one side of the shaft than on the other. While this difference is here illustrated only in the arched form, it is evident that it could be applied equally well to any of the forms hereinbefore illustrated.

The application of the mechanical movement herein described in engine practice, pumps, compresses, &c., and in other forms will be shown in separate application for Letters Patent.

It is obvious that in the forms shown in the drawings and described to a mechanic skilled in the art it would not require inventive skill to have ports and channels lead in through the abutments or center pieces to the pockets formed by this mechanical movement and to apply suitable valve-gear to work in conjunction with the same for opening and closing these ports at proper intervals, so as to make an operative device for controlling the admission and exhausting of fluids.

What I claim as new is—

1. A mechanical movement comprising a rotary shaft having a plurality of projecting noses mounted upon the same and positioned at different distances from the shaft; said projecting noses being mounted to turn with the shaft and to have a movement at an angle to the plane of their rotation, and end abutments adapted to conform to the noses, substantially as described.

2. A mechanical movement comprising a rotary shaft having a plurality of independent projecting noses mounted upon the same and positioned at different distances from the shaft; said projecting noses being mounted to turn with the shaft and to have a movement at an angle to the plane of their rotation, and end abutments adapted to conform to the noses, substantially as described.

In testimony whereof I have hereunto set my hand in the presence of two subscribing witnesses.

FRED. W. JAEGER.

Witnesses:
EUGENIE P. HENDRICKSON,
GEORGE W. EISENBRAUN.